United States Patent
Chae et al.

(10) Patent No.: US 11,972,516 B2
(45) Date of Patent: Apr. 30, 2024

(54) METHOD AND DEVICE FOR GENERATING SPEECH VIDEO BY USING TEXT

(71) Applicant: DEEPBRAIN AI INC., Seoul (KR)

(72) Inventors: Gyeongsu Chae, Seoul (KR); Guembuel Hwang, Seoul (KR); Sungwoo Park, Seoul (KR); Seyoung Jang, Seoul (KR)

(73) Assignee: DEEPBRAIN AI INC., Seoul (KR)

( * ) Notice: Subject to any disclaimer, the term of this patent is extended or adjusted under 35 U.S.C. 154(b) by 218 days.

(21) Appl. No.: 17/620,863

(22) PCT Filed: Jun. 19, 2020

(86) PCT No.: PCT/KR2020/007978
§ 371 (c)(1),
(2) Date: May 10, 2022

(87) PCT Pub. No.: WO2020/256475
PCT Pub. Date: Dec. 24, 2020

(65) Prior Publication Data
US 2022/0351439 A1   Nov. 3, 2022

(30) Foreign Application Priority Data

Jun. 21, 2019   (KR) .................. 10-2019-0074158
Jun. 16, 2020   (KR) .................. 10-2020-0073099

(51) Int. Cl.
*G06T 13/20*   (2011.01)
*G06T 13/40*   (2011.01)
(Continued)

(52) U.S. Cl.
CPC ............ *G06T 13/205* (2013.01); *G06T 13/40* (2013.01); *G06V 10/82* (2022.01); *G06V 40/171* (2022.01)

(58) Field of Classification Search
None
See application file for complete search history.

(56) References Cited

U.S. PATENT DOCUMENTS 7,168,953 B1 *   1/2007   Poggio .................. G06T 13/205
                                                                704/E21.02
10,878,824 B2 *  12/2020   Carpenter, II .......... G10L 17/06
(Continued)

FOREIGN PATENT DOCUMENTS

KR   10-2006-0020632 A   3/2006
KR   10-2006-0090687 A   8/2006
(Continued)

OTHER PUBLICATIONS

Gabbay et al., "Visual Speech Enhancement", (Year: 2018).*
(Continued)

*Primary Examiner* — Hilina K Demeter
(74) *Attorney, Agent, or Firm* — The PL Law Group, PLLC (57) ABSTRACT

A device for generating a speech video according to an embodiment has one or more processor and a memory storing one or more programs executable by the one or more processors, and the device includes a video part generator configured to receive a person background image of a person and generate a video part of a speech video of the person; and an audio part generator configured to receive text, generate an audio part of the speech video of the person, and provide speech-related information occurring during the generation of the audio part to the video part generator.

10 Claims, 5 Drawing Sheets

(51) Int. Cl.
  *G06V 10/82* (2022.01)
  *G06V 40/16* (2022.01)

(56) References Cited

U.S. PATENT DOCUMENTS

| | | | | |
|---|---|---|---|---|
| 2018/0336713 | A1* | 11/2018 | Avendano | G06T 13/40 |
| 2019/0005976 | A1* | 1/2019 | Peleg | G10L 25/30 |
| 2020/0075033 | A1* | 3/2020 | Hijazi | G06N 3/086 |
| 2020/0342646 | A1* | 10/2020 | Wang | G06N 3/045 |

FOREIGN PATENT DOCUMENTS

| | | |
|---|---|---|
| KR | 10-2012-0130627 A | 12/2012 |
| KR | 10-2014-0037410 A | 3/2014 |

OTHER PUBLICATIONS

Ezzat et al., "Trainable Video-realistic Speech Animation", (Year: 2002).*

Hori et al. "Attention-Based Multimodal Fusion for Video Description" (Year: 2017).*

Suwajanakorn et al. "Synthesizing Obama: Learning Lip Sync from Audio" (Year: 2017).*

Lele Chen et al., "Hierarchical Cross-Modal Talking Face Generation with Dynamic Pixel-Wise Loss", arXiv:1905.03820v1, 2019.

Rithesh Kumar et al., "ObamaNet: Photo-realistic lip-sync from text", arXiv:1801.01442v1 [cs.CV] Dec. 6, 2017.

Yuxuan Wang et al., "TACOTRON: Towards End-To-End Speech Synthesis", arXiv:1703.10135v2 [cs.CL] Apr. 6, 2017.

Office action issued on Jul. 25, 2021 from Korean Patent Office in a counterpart Korean Patent Application No. 10-2020-0073099 (all the cited references are listed in this IDS.) (English translation is also submitted herewith.).

International Search Report for PCT/KR2020/007978 mailed on Oct. 7, 2020.

Konstantinos Vougioukas et al., "Realistic Speech-Driven Facial Animation with GANs", arXiv:1906.06337v1., Jun. 14, 2019, p. 1-16.

* cited by examiner

METHOD AND DEVICE FOR GENERATING SPEECH VIDEO BY USING TEXT

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/007978, filed Jun. 19, 2020, which claims priority to the benefit of Korean Patent Application Nos. 10-2019-0074158 filed on Jun. 21, 2019 and 10-2020-0073099 filed on Jun. 16, 2020 in the Korean Intellectual Property Office, the entire contents of which are incorporated herein by reference.

BACKGROUND

1. Technical Field

Embodiments of the present disclosure relate to a technology for generating a speech video on the basis of machine learning.

2. Background Art

Recently, various types of content have been generated through the use of artificial intelligence technology, in line with technological developments in the artificial intelligence field. As an example thereof, in the case that a spoken message is intended to be delivered, a speech video in which a famous person, such as a President, delivers the message as a speech may be generated from the spoken message in order to attract people's attention. The speech video of the famous person may be generated by changing the shape of the person's mouth to match the words of a specific message, as if the famous person were speaking.

In this regard, in the related art, a method of generating landmarks or key points related to a voice from an existing speech image, learning the landmarks or key points, and then synthesizing an image matching an input voice using a learned model has been used. However, in this related-art technology, for such learning, a process of extracting key points and transforming and inverse transforming the extracted key points to a standard space (i.e., a position facing the front from the center of the screen) is essentially required, and a step of synthesizing the key points and a step of synthesizing images are required. Accordingly, the process is complicated, which is problematic.

In addition, in the case that no key points are used, a method of extracting a face portion, arranging the size and position, and then synthesizing an image matching an input voice is used. Since a natural movement of a person is not reflected, a resultant image may be unnatural, which is problematic.

SUMMARY

Embodiments of the present disclosure provide a method and device for generating a speech video on the basis of machine learning, wherein the method and device may simplify a neural network structure.

Embodiments of the present disclosure also provide a method and device for generating a speech video on the basis of machine learning, wherein the method and device may reflect movements or gestures occurring in the case of a voice speech.

According to an embodiment, provided is a device for generating a speech video having one or more processor and a memory storing one or more programs executable by the one or more processors, the device comprises: a video part generator configured to receive a person background image of a person and generate a video part of a speech video of the person; and an audio part generator configured to receive text, generate an audio part of the speech video of the person, and provide speech-related information occurring during the generation of the audio part to the video part generator.

The person background image may be an image in which a portion related to speech of the person may be covered with a mask, and the video part generator may be further configured to reconstruct the portion related to the speech and covered with the mask based on the speech-related information.

The video part generator may include: a first encoder configured to receive the person background image and extracting an image feature vector from the person background image; a combiner configured to generate a combined vector by combining the image feature vector output from the first encoder and the speech-related information input from the audio part generator; and a first decoder configured to reconstruct the video part of the speech video using the combined vector as an input. The first decoder may be a machine learning model that is trained to reconstruct the portion of the person background image covered with the mask based on the speech-related information.

The video part generator may further include at least one residual block provided between the combiner and the first decoder. The residual block may use the combined vector output from the combiner as an input value, and may be trained minimize a difference between the input value and an output value output from the at least one residual block. The video part generator may include: an attention unit configured to receive the video part output from the first decoder and generate an attention map by determining an attention weight for each pixel of the video part; a speech-related portion extractor configured to receive the video part output from the first decoder and output a speech-related image by extracting a speech-related portion from the video part; and a reconstruction outputter configured to receive the background image input to the first encoder, the attention map, and the speech-related image and output a final video part of the person.

The reconstruction outputter may be further configured to reconstruct a portion of the final video part not related to the speech based on the person background image and a portion of the final video part related to the speech based on the speech-related image.

The audio part generator may include: a second encoder configured to receive the text and generate a context vector from the text; and a second decoder configured to receive the context vector and output a voice spectrogram signal as a voice of the person from the context vector.

The audio part generator may further include an attention unit provided between the second encoder and the second decoder and configured to learn correspondence over time between the context vector and the voice spectrogram signal. The device may further include an output selector configured to provide or not provide the speech-related information to the video part generator in response to an input instruction.

The output selector may be further configured to set the audio signal not to be output from the audio part generator while providing the speech-related information to the video part generator in response to the input instruction.

According to another embodiment, provided is a method for generating a speech video executed by a computing device including one or more processors and a memory storing one or more programs executable by the one or more processors, the method may include: receiving, by a video part generator of the computing device, a person background image of a person; generating, by the video part generator, a video part of a speech video of the person; and receiving, by an audio part generator of the computing device, text; generating, by the audio part generator, an audio part of the speech video of the person; and providing, by the audio part generator, speech-related information occurring during the generation of the audio part to the video part generator.

According to embodiments of the present disclosure, when text is input, the audio part of the person is generated by synthesizing the voice from the text, and the video part of the speech video in which the person is speaking is generated by using the speech-related information generated during the speech synthesis process. In this manner, it is possible to generate both the video part and the audio part through a single neural network model, thereby simplifying the neural network structure.

In addition, since both the video part and the audio part are generated through the single neural network, the video part and the audio part can be learned in a complementary manner. For example, speech-related information for the video part may be obtained more plentifully from the audio part. The audio part may limit the generation of a voice so that the speech of the video may be more properly synthesized in the generation of the voice.

Furthermore, since the speech-related information generated based on text is used to reconstruct the image of the portions covered with the mask in the person background image, it is possible to learn by complementing irregular or unclear portions of the audio signal through text. Thus, feedback is possible so that correct pronunciation of the corresponding person is obtained. In addition, the image of the speech-related portions covered with the mask in the video part can be reconstructed more accurately.

In addition, learning is performed using the person background image of a person including the face and the upper body in a situation in which the portions related to a speech are masked. Thus, it is possible to generate a speech video by reflecting gestures or characteristics unique to the person, such as movements of the face, neck, shoulders, and the like of the person, which occur when the person is speaking. Consequently, it is possible to generate a video containing a more natural speech.

Furthermore, it is possible to generate the speech video using a single neural network model without a separate key point estimation process by reconstructing the masked speech-related portions of the image of the speech video from the speech-related information.

BRIEF DESCRIPTION OF THE DRAWINGS

The above and other objectives, features, and advantages of the present disclosure will be more clearly understood from the following detailed description, taken in conjunction with the accompanying drawings, in which.

DETAILED DESCRIPTION

Hereinafter, specific embodiments of the present disclosure will be described with reference to the accompanying drawings. The following detailed description is provided to assist in gaining a comprehensive understanding of at least one of a method, a device, and a system to be described herein. However, the detailed description is merely exemplary, and the present disclosure is not limited thereto.

In the description of embodiments of the present disclosure, a detailed description of known technologies related to the present disclosure will be omitted in the case in which the subject matter of the present disclosure may be rendered unclear thereby. Terms to be used hereinafter will be defined in consideration of functions thereof in embodiments of the present disclosure, but may vary depending on the intentions of users or operators, as well as in practice. Therefore, the terms shall be defined on the basis of the descriptions throughout the specification. The terms used in the detailed description shall be interpreted as being illustrative, while not being limitative, of embodiments. Unless clearly used otherwise, a singular form includes a plural meaning. It shall be understood that expressions such as "comprise," "include," and "have," as used herein, are for indicating certain features, numbers, steps, operations, elements, a portion or combinations thereof and are not to be interpreted as excluding the presence or possibility of one or more features, numbers, steps, operations, elements, a portion or combinations thereof other than the above.

In the following description, terms, such as "sending," "communication," "transmission," and "reception" of a signal or information include not only direct transfer of a signal or information from a first element to a second element, but also the transfer of a signal or information from the first element to the second element through a third intervening element. In particular, the "transmission" or "sending" of a signal or information to the first element refers to a final designation of the signal or information but does not refer to a direct destination. This is the same regarding the "reception" of a signal or information. In addition, herein, a "relation" of two or more pieces of data or information indicates that acquisition of first data (or information) may acquire second data (or information) on the basis of the first data (or information).

In addition, terms, such as first and second, may be used in describing a variety of elements, but the elements are not limited by such terms. Such terms may be used to distinguish one element from other elements. For example, a first element may be referred to as a second element and, in a similar manner, a second element may be referred to as a first element without departing from the scope of the present disclosure.

Figure 1:
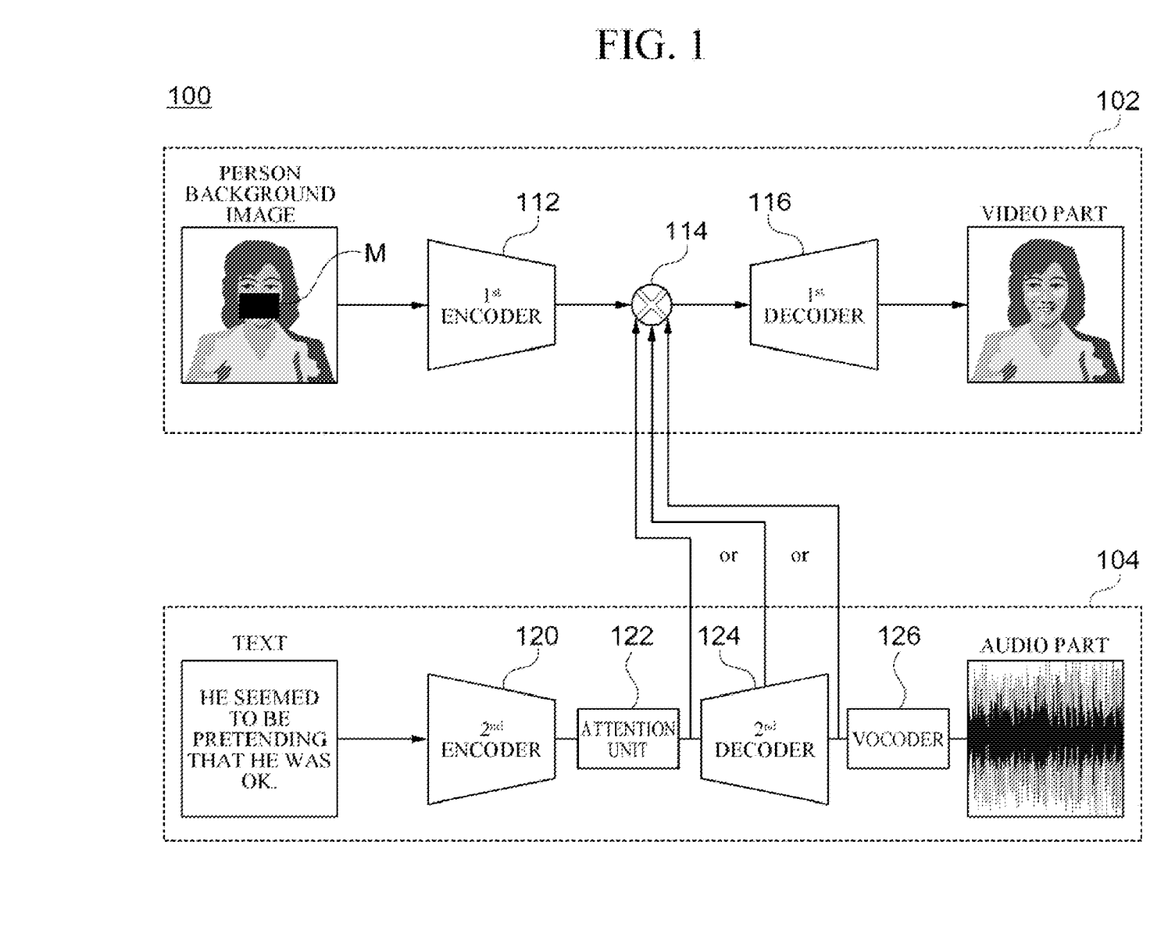
FIG. 1 is a block diagram illustrating a configuration of a device for generating a speech video according to an embodiment of the present disclosure.

FIG. 1 is a block diagram illustrating a configuration of a device for generating a speech video having a single neural network structure according to an embodiment of the present disclosure. Referring to FIG. 1, the device 100 for generating a speech video may include a video part generator 102 and an audio part generator 104.

The video part generator 102 may be a portion generating a video part of a speech video. The video part generator 102 may generate the video part of the speech video by receiving a person background image of a person, in which a portion related to the speech of the person are covered with a mask M, and speech-related information of the person as inputs. Here, in the video part of the speech video, the portion covered with the mask M may be reconstructed on the basis of the speech-related information. The video part generator 102 may include a first encoder 112, a combiner 114, and a first decoder 116.

The audio part generator 104 may be a portion generating the audio part of the speech video. The audio part generator 104 may use a text as an input and generate the speech-related information used in the audio part of the speech video from the input text. The audio part generator 104 may provide the speech-related information to the video part generator 102. The audio part generator 104 may include a second encoder 120, an attention unit 122, a second decoder 124, and a vocoder 126. Here, the speech-related information may be data output from one of the attention unit 122, the second decoder 124, and the vocoder 126.

Here, the video part generator 102 and the audio part generator 104 may be implemented as a single neural network. The video part generator 102 and the audio part generator 104 generate the video part and the audio part of the speech video, respectively. The speech-related information produced during the generation of the audio part may be provided to the video part generator 102, so that both the video part and the audio part can be generated at the same time using a single neural network.

The configuration of the device 100 for generating a speech video illustrated in FIG. 1 shows functionally distinguished functional elements. The functional elements may be functionally connected to each other in order to perform functions according to the present disclosure, and one or more of the functional elements may be physically integrated.

In an example embodiment, the device 100 for generating a speech video may be implemented by a machine learning technology based on a convolutional neural network (CNN), but the machine learning technology is not limited thereto. Rather, a variety of other machine learning technologies may be used. Hereinafter, a learning process for generating a speech video will mainly be described.

The first encoder 112 may be a machine learning model that is trained to extract an image feature vector using a person background image as an input. Hereinafter, the term "vector" may be used with a meaning encompassing a "tensor." Here, the person background image input to the first encoder 112 is an image in which a particular person utters (speaks). The person background image may be an image including a face and an upper body of a person. That is, the person background image may include not only the face but also the upper body of the person so that movements of the face, neck, shoulders, and the like occurring when the corresponding person is speaking may be seen.

In the person background image input to the first encoder 112, portions related to the speech may be masked. That is, in the person background image, the portions related to the speech (e.g., the mouth and portions around the mouth) may be covered with the mask M. In addition, during a masking process, the portions related to movements of the face, neck, shoulders, and the like caused by the speech of the person in the person background image may not be masked. Then, the first encoder 112 extracts image feature vectors from the portions of the person background image, except for the portions related to the speech.

The first encoder 112 may include at least one convolutional layer and at least one pooling layer. The convolutional layer may extract feature values of pixels corresponding to a filter having a predetermined size (e.g., 3×3 pixel size) while moving the filter at predetermined intervals in the input person background image. The pooling layer may perform down-sampling by using an output of the convolutional layer as an input.

The combiner 114 may generate the combined vector by combining the image feature vector output from the first encoder 112 and the speech-related information generated by the audio part generator 104. In an example embodiment, the speech-related information input to the combiner 114 may be one of data output from the attention unit 122, data output from the second decoder 124, and intermediate output data being processed by the second decoder 124.

In an example embodiment, the combiner 114 may generate the combined vector by concatenating the image feature vector and the speech-related information, but is not limited thereto.

The first decoder 116 may reconstruct the video part of the speech video of the person using the combined vector output from the combiner 114 as an input. Specifically, the first decoder 116 may be a machine learning model that is trained to reconstruct portions covered with the mask M (i.e., speech-related portions) in the person background image output from the first encoder 114, on the basis of the speech-related information generated by the audio part generator 104. That is, the decoder 116 may be a model trained to reconstruct the video part of the masked area in the person background image using the speech-related information when the masked area is the portion related to the speech. In this case, the speech video of a person may be generated through a single neural network structure by using text as an input.

In an example embodiment, the first decoder 116 may generate the video part of the speech video by performing deconvolution on the combined vector in which the image feature vector output from the first encoder 112 and the speech-related information output from the second encoder 104 are combined, followed by up-sampling.

The second encoder 120 may be a machine learning model that is trained to extract a context vector regarding text by using the text as an input. The second encoder 120 may generate an input sequence based on the text and generate the context vector from the input sequence. For example, the second encoder 120 may generate the input sequence from the text using a sequence-to-sequence model.

The attention unit 122 may be a machine learning model configured to learn the correspondence over time between text (i.e., data input to the audio part generator 104) and a voice spectrogram signal (i.e., data output from the audio part generator 104). For example, in the case of sequence data $[(X_0, Y_0) (X_1, Y_1), \ldots,$ and $(X_t, Y_t)]$ in which inputs correspond to outputs over time, learning may be performed through a neural network or the like, since an output is determined for each input. However, when the input data is text and the output data is a voice spectrogram signal, it is difficult to determine the correspondence between input data $(X_i)$ and output data $(Y_j)$ as in Equation 1:

$$[(X_0, X_1, \ldots, X_i), (Y_0, Y_1, \ldots, Y_j)], i \neq j \qquad (1)$$

Thus, it is possible to learn the correspondence over time between the text, i.e., input data, and the voice spectrogram signal, i.e., output data, by the attention unit 122. The attention unit 122 may learn the voice spectrogram signal at time j to which the text (i.e., a context vector) at time i is related. The attention unit 122 may arrange the context vector in the same length as the voice spectrogram signal depending on the correspondence over time between the context vector and the voice spectrogram signal.

The attention unit 122 may determine an attention weight for the context vector generated by the second decoder 124 at a current output point in time of the second decoder 124. Here, the attention weight may indicate which portion of the context vector is to be concentrated in order to determine the voice spectrogram signal to be output at the current output point in time of the second decoder 124.

The second decoder 124 may be a machine learning model that is trained to output the voice spectrogram signal on the basis of the context vector output from the second encoder 120. When the context vector is input, the second decoder 124 may output the voice spectrogram signal by considering the attention weight determined by the attention unit 122. The second decoder 124 may be trained to output the voice spectrogram signal as the voice of the person in the person background image from the text. In an example embodiment, the second decoder 124 may deliver the voice spectrogram signal to the combiner 114.

The vocoder 126 may generate a voice signal using the voice spectrogram signal output from the second decoder 124 as an input. That is, the vocoder 126 may transform the voice spectrogram signal into an audio signal that may be output using a speaker or the like.

According to embodiments of the present disclosure, when the text is input, the audio part of the person is generated by synthesizing the voice from the text, and the video part of the speech video in which the person is speaking is generated by using the speech-related information generated during the speech synthesis process. In this manner, it is possible to generate both the video part and the audio part through a single neural network model, thereby simplifying the neural network structure.

In addition, since both the video part and the audio part are generated through the single neural network, the video part and the audio part can be learned in a complementary manner. For example, speech-related information for the video part may be obtained more plentifully from the audio part. The audio part may limit the generation of a voice so that the speech of the video may be more properly synthesized in the generation of the voice.

Furthermore, since the speech-related information generated based on the text is used to reconstruct the image of the portion covered with the mask M in the person background image, it is possible to learn by complementing irregular or unclear portions of the audio signal through text. Thus, correct pronunciation of the corresponding person may be obtained through feedback. In addition, the image of the speech-related portions covered with the mask in the video part can be reconstructed more accurately.

In addition, learning is performed using the person background image of a person including the face and the upper body in a situation in which the portions related to a speech are masked. Thus, it is possible to generate a speech video by reflecting gestures or characteristics unique to the person, such as movements of the face, neck, shoulders, and the like of the person, which occur when the person is speaking. Consequently, it is possible to generate a video containing a more natural speech.

Furthermore, it is possible to generate the speech video using a single neural network model without a separate key point estimation process by reconstructing the masked speech-related portions of the speech video from the speech-related information.

In addition, since the speech vide including not only the face but also the upper body is generated, it can be naturally pasted without additional transformation or synthesis of other body parts of the person (e.g., the trunk, arms, or legs).

Figure 2:
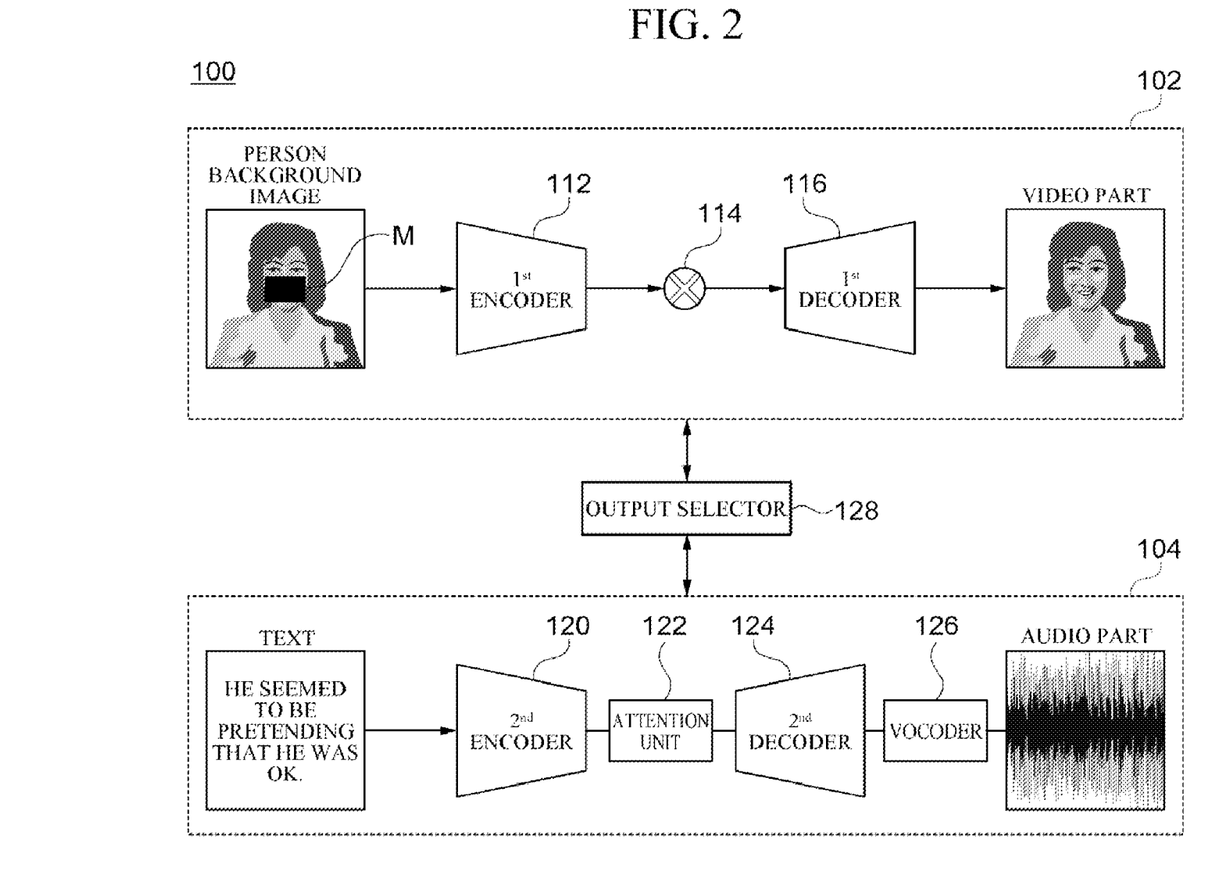
FIG. 2 is a diagram illustrating a configuration of a device for generating a speech video according to another embodiment of the present disclosure.

FIG. 2 is a block diagram illustrating a configuration of a device for generating a speech video according to another embodiment of the present disclosure. Here, features different from those of the foregoing embodiment illustrated in FIG. 1 will be mainly described.

Referring to FIG. 2, the device 100 for generating a speech video may further include an output selector 128. The output selector 128 may or may not provide the speech-related information generated by the audio part generator 104 to the video part generator 102 in response to an input instruction.

Here, when the output selector 128 provides the speech-related information to the video part generator 102, the device 100 for generating a speech video may generate the video part and the audio part of the speech video. In contrast, when the output selector 128 does not provide the speech-related information to the video part generator 102, the device 100 for generating a speech video only generates the audio part of the speech video.

In addition, the output selector 128 may set the audio signal not to be output from the audio part generator 104 while providing the speech-related information generated by the audio part generator 104 to the video part generator 102 in response to the input instruction. In this case, the device 100 for generating a speech video only generates the video part of the speech video.

As described above, only the audio part or the video part of the speech video may be generated by the output selector 128, or both the audio part and the video part of the speech video may be generated by the output selector 128.

Figure 3:
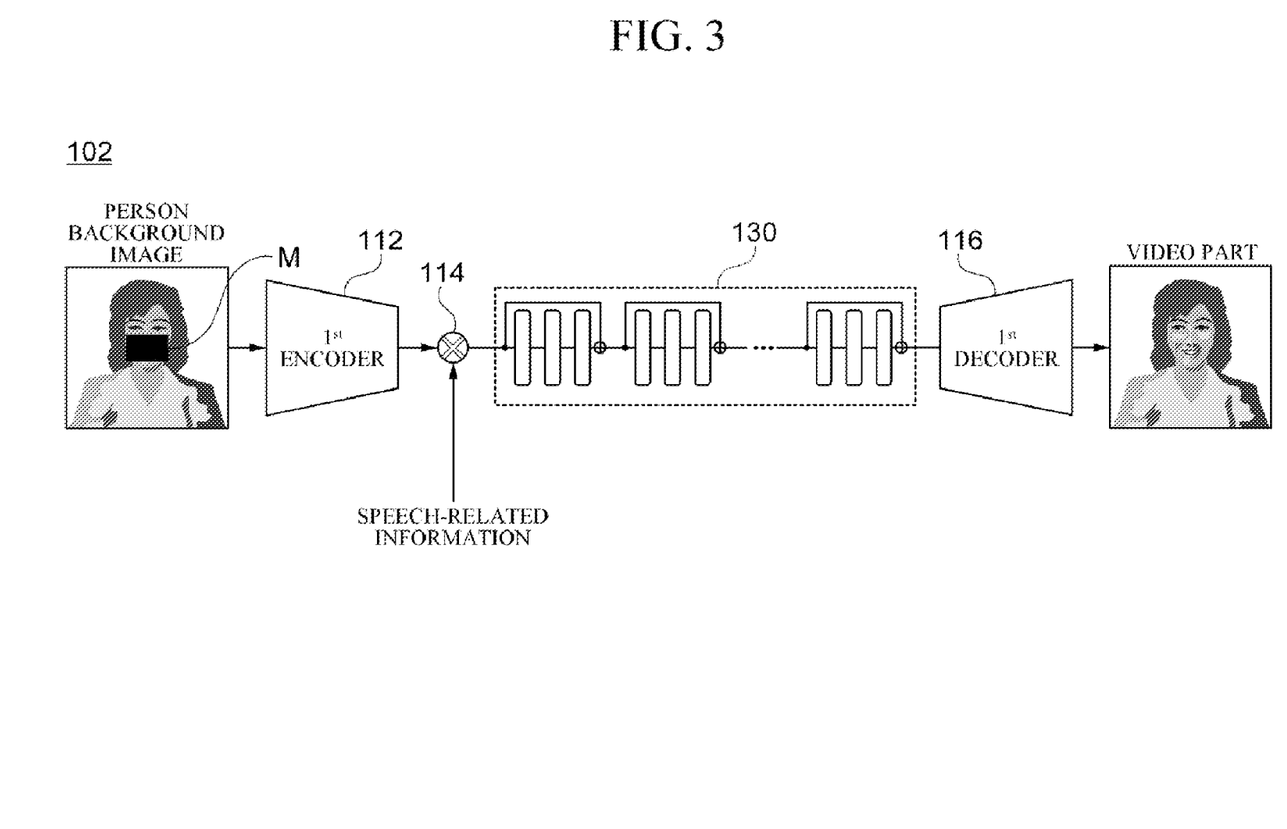
FIG. 3 is a diagram illustrating the video part generator of the device for generating a speech video according to the other embodiment of the present disclosure.

FIG. 3 is a diagram illustrating the video part generator of the device for generating a speech video according to the other embodiment of the present disclosure. Here, features different from those of the foregoing embodiment illustrated in FIG. 1 will be mainly described.

Referring to FIG. 3, the video part generator 102 may further include residual blocks 130. One or more residual blocks 130 may be provided between the combiner 114 and the first decoder 116. In an example embodiment, a plurality of residual blocks 130 may be provided between the combiner 114 and the decoder 116 and may be sequentially connected (in series) between the combiner 114 and the decoder 116.

The residual blocks 130 may include one or more convolutional layers. The residual blocks 130 may have a structure performing convolution to an input value (i.e., a combined vector output from the combiner 114) and adding the input value to a result value obtained by performing the convolution. The residual blocks 130 may be trained to minimize a difference between the input value and the output value of the residual blocks 130. Consequently, the image feature vector and the voice feature vector of the speech video may be systematically combined, and the result of the combination may be used as an input to the first decoder 116.

Figure 4:
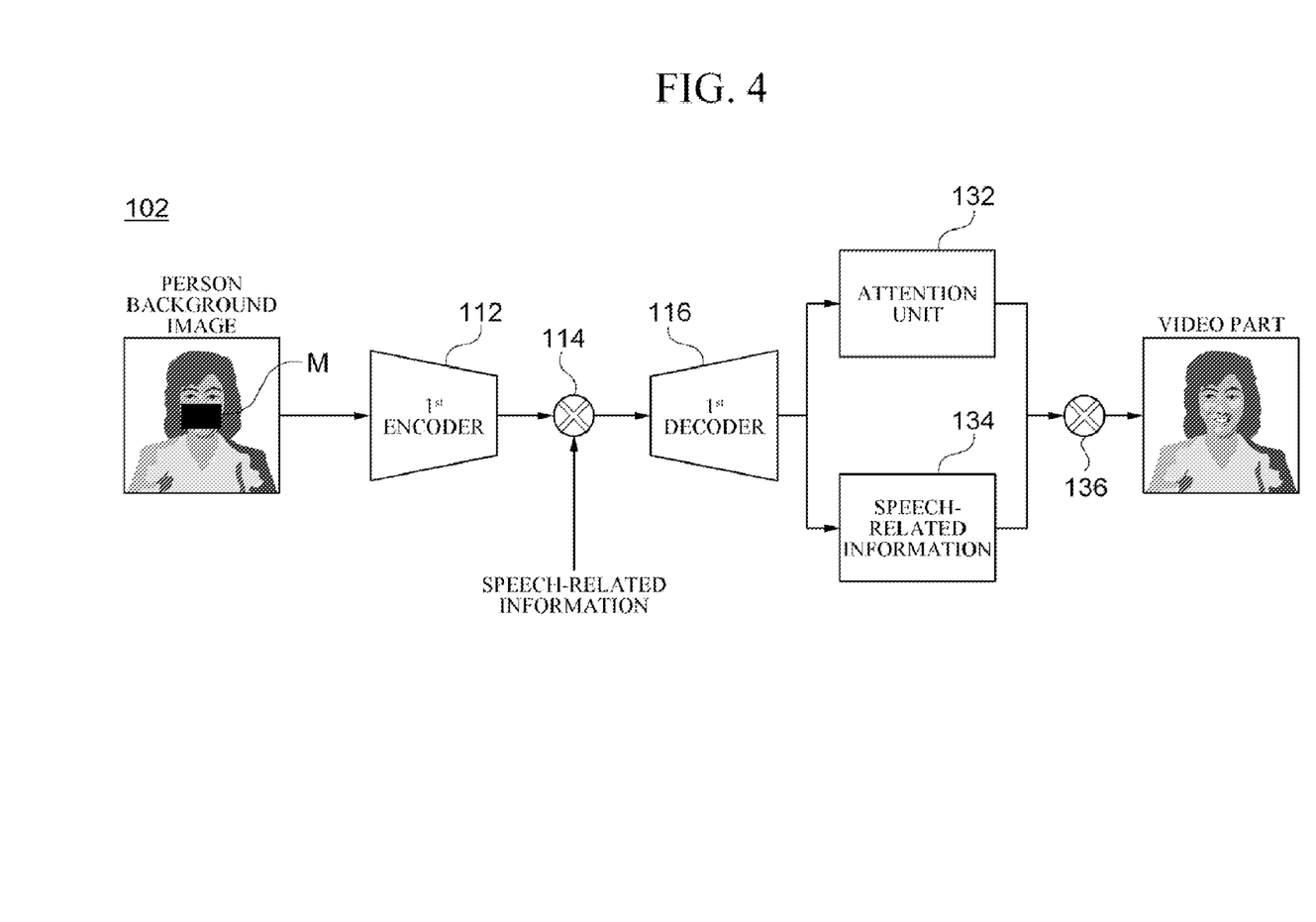
FIG. 4 is a diagram illustrating a video part generator of the device for generating a speech video according to another embodiment of the present disclosure.

FIG. 4 is a diagram illustrating a video part generator of the device for generating a speech video according to another embodiment of the present disclosure. Here, features different from those of the foregoing embodiment illustrated in FIG. 1 will be mainly described.

Referring to FIG. 4, the video part generator 102 may further include an attention unit 132, a speech-related portion extractor 134, and a reconstruction outputter 136. Here, the attention unit 132 and the speech-related portion extractor 134 may be connected to output of the decoder 116, respectively. That is, each of the attention unit 132 and the speech-related portion extractor 134 may receive the video part (hereinafter, also referred to as a first-reconstructed video part) output from the first decoder 116 as an input.

The attention unit 132 may output an attention map by determining pixel-specific attention weights of the first-reconstructed video part of the speech video. Each of the attention weights may be a value in the range of 0 to 1.

Specifically, in second reconstruction of the video part according to the pixels of the first-reconstructed video part by the reconstruction outputter 136, the attention unit 132 may set the attention weights for determining whether to use a person background image (i.e., an image in which speech-related portions are covered with a mask) used as an input to the first encoder 112 or a speech-related image output from the speech-related portion extractor 134.

The speech-related portion extractor 134 may output the speech-related image by extracting the portions related to the speech (i.e., the speech-related portions) from the first-reconstructed video part. In an example embodiment, the speech-related portion extractor 134 may generate a speech-related image by extracting pixel values of the speech-related portions of the first-reconstructed video part and filling the remaining portions with random values (e.g., unused values).

The reconstruction outputter 136 may output a final video part of the speech video by combining the person background image used as an input to the first encoder 112, the attention map output from the attention unit 132, and the speech-related image output from the speech-related portion extractor 134.

The reconstruction outputter 136 may reconstruct the final video part using the background image for the portions not related to the speech and reconstruct the final video part using the speech-related image for the speech-related portions, on the basis of the attention map (including pixel-specific attention weight values).

In an example embodiment, the reconstruction outputter 136 may reconstruct the final video part P by the following Equation 1.

$$P = A \cdot I + (1-A) \cdot C \qquad (1)$$

where A indicates the attention weight of each of the pixels, I indicates each of the pixel values of the person background image, and C indicates each of the pixel values of the speech-related image.

According to Equation 1, as A is closer to 0, the final video part is more influenced by the speech-related image. On the other hand, as A is closer to 1, the final video part is more influenced by the person background image. Thus, the attention unit 132 may determine the pixel-specific attention weights so that each of the attention weights of the portions not related to the speech is close to 1 and each of the attention weights of the speech-related portions is close to 0.

Figure 5:
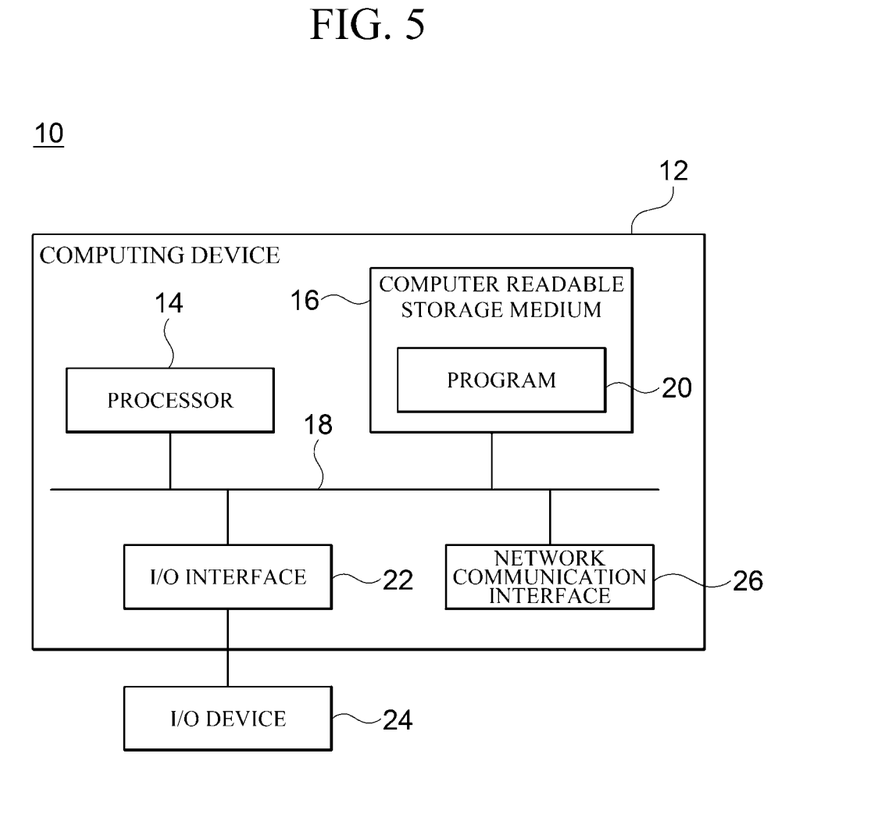
FIG. 5 is a block diagram illustrating a computing environment including a computing device suitable to be used in example embodiments.

FIG. 5 is a block diagram illustrating a computing environment 10 including a computing device suitable to be used in example embodiments. In the illustrated embodiment, each component may have a function and capability different from those to be described below, and additional components not described below may be included.

The illustrated computing environment 10 includes a computing device 12. According to an embodiment, the computing device 12 may be the device 100 for generating a speech video.

The computing device 12 includes at least one processor 14, a computer readable storage medium 16, and a communication bus 18. The processor 14 may allow the computing device 12 to operate according to the example embodiments described above. For example, the processor 14 may execute one or more programs stored in the computer readable storage medium 16. The one or more programs may include one or more computer executable instructions. The computer executable instructions may be configured to allow the computing device 12 to perform the operations according to the example embodiments when executed by the processor 14.

The computer readable storage medium 16 may be configured to store computer executable instructions, program codes, program data, and/or other suitable forms of information. A program 20 stored in the computer readable storage medium 16 may include a set of instructions executable by the processor 14. According to an embodiment, the computer readable storage medium 16 may be a memory (e.g., a volatile memory such as a random access memory (RAM), a non-volatile memory, or a combination thereof), one or more magnetic disk storage devices, optical disk storage devices, flash memory devices, other types of storage media which can be accessed by the computing device 12 and store intended information, or combinations thereof.

The communication bus 18 may include the processor 14 and the computer readable storage medium 16, and interconnect various components of the computing device 12 to each other. The computing device 12 may include one or more input/output (I/O) interfaces 22 providing an interface for one or more I/O devices 24 and one or more network communication interfaces 26. The I/O interface 22 and the network communication interfaces 26 may be connected to the communication bus 18. The I/O devices 24 may include input devices, such as a pointing device (e.g., a mouse and a track pad), a keyboard, a touch input device (e.g., a touch pad and a touch screen), a voice or sound input device, various types of sensors, and/or a capturing device, and/or output devices, such as a display device, a printer, a speaker, and/or a network card. Each of the I/O devices 24 may be one component constituting the computing device 12, may be included in the computing device 12, or may be connected to the computing device 12 as a device separate from the computing device 12.

Although the exemplary embodiments of the present disclosure have been described in detail hereinabove, a person having ordinary knowledge in the technical field to which the present disclosure pertains will appreciate that various modifications are possible to the foregoing embodiments without departing from the scope of the present disclosure. Therefore, the scope of protection of the present disclosure shall not be limited to the foregoing embodiments but shall be defined by the appended Claims and equivalents thereof.

What is claimed is:
1. A device for generating a speech video, the device having one or more processor and a memory storing one or more programs executable by the one or more processors, the device comprising:
   a video part generator configured to receive a person background image of a person and generate a video part of a speech video of the person; and an audio part generator configured to receive text, generate an audio part of the speech video of the person, and provide speech-related information occurring during the generation of the audio part to the video part generator,
wherein the person background image is an image in which a portion of related to speech of the person is covered with a mask,
wherein the video part generator comprises:
a first encoder configured to receive the person background image and extract an image feature vector from the person background image;
a combiner configured to generate a combined vector by combining the image feature vector output from the first encoder and the speech-related information input from the audio part generator;
a first decoder configured to reconstruct the video part of the speech video using the combined vector as an input;
an attention unit configured to receive the video part output from the first decoder and generate an attention map by determining an attention weight for each pixel of the video part;
a speech-related portion extractor configured to receive the video part output from the first decoder and output a speech-related image by extracting a speech-related portion from the video part; and
a reconstruction outputter configured to receive the background image input to the first encoder, the attention map, and the speech-related image and output a final video part of the person.

2. The device of claim 1,
wherein the video part generator is further configured to reconstruct the portion related to the speech and covered with the mask based on the speech-related information.

3. The device of claim 2, wherein the first decoder is a machine learning model that is trained to reconstruct the portion of the person background image covered with the mask based on the speech-related information.

4. The device of claim 2, wherein the video part generator further comprises at least one residual block provided between the combiner and the first decoder, and
wherein the residual block uses the combined vector output from the combiner as an input value, and is trained to minimize a difference between the input value and an output value output from the at least one residual block.

5. The device of claim 2, wherein the reconstruction outputter is further configured to reconstruct a portion of the final video part not related to the speech based on the person background image and a portion of the final video part related to the speech based on the speech-related image.

6. The device of claim 1, wherein the audio part generator comprises:
a second encoder configured to receive the text and generate a context vector from the text; and
a second decoder configured to receive the context vector and output a voice spectrogram signal as a voice of the person from the context vector.

7. The device of claim 6, wherein the audio part generator further comprises:
an attention unit provided between the second encoder and the second decoder and configured to learn correspondence over time between the context vector and the voice spectrogram signal.

8. The device of claim 1, further comprising an output selector configured to provide or not provide the speech-related information to the video part generator in response to an input instruction.

9. The device of claim 8, wherein the output selector is further configured to set the audio signal not to be output from the audio part generator while providing the speech-related information to the video part generator in response to the input instruction.

10. A method for generating a speech video, the method executed by a computing device having one or more processors and a memory storing one or more programs executable by the one or more processors, the method comprising:
receiving, by a video part generator of the computing device, a person background image of a person;
generating, by the video part generator, a video part of a speech video of the person; and
receiving, by an audio part generator of the computing device, text;
generating, by the audio part generator, an audio part of the speech video of the person; and
providing, by the audio part generator, speech-related information occurring during the generation of the audio part to the video part generator,
wherein the person background image is an image in which a portion of related to speech of the person is covered with a mask,
wherein the generating method, by the video part generator, comprising:
receiving, by a first encoder, the person background image;
extracting, by the first encoder, an image feature vector from the person background image;
generating, by a combiner, a combined vector by combining the image feature vector output from the first encoder and the speech-related information input from the audio part generator;
reconstructing, by a first decoder, the video part of the speech video using the combined vector as an input;
receiving, by an attention unit, the video part output from the first decoder;
generating, by the attention unit, an attention map by determining an attention weight for each pixel of the video part;
receiving, by a speech-related portion extractor, the video part output from the first decoder;
outputting, by the speech-related portion extractor, a speech-related image by extracting a speech-related portion from the video part;
receiving, by a reconstruction outputter, the background image input to the first encoder, the attention map, and the speech-related image; and
outputting, by the reconstruction outputter, a final video part of the person.

* * * * *